United States Patent
Ergin et al.

(10) Patent No.: US 11,368,084 B2
(45) Date of Patent: Jun. 21, 2022

(54) CURRENT CONVERTER UNIT, TRANSMISSION INSTALLATION HAVING A CURRENT CONVERTER UNIT, AND METHOD FOR FAULT MANAGEMENT IN A CURRENT CONVERTER UNIT

(71) Applicant: Siemens Energy Global GmbH & Co. KG, Munich (DE)

(72) Inventors: Dominik Ergin, Baiersdorf (DE); Matthias Burkhardt, Erlangen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/634,643

(22) PCT Filed: Jun. 29, 2018

(86) PCT No.: PCT/EP2018/067534
§ 371 (c)(1),
(2) Date: Jan. 28, 2020

(87) PCT Pub. No.: WO2019/020312
PCT Pub. Date: Jan. 31, 2019

(65) Prior Publication Data
US 2020/0389084 A1 Dec. 10, 2020

(30) Foreign Application Priority Data

Jul. 28, 2017 (DE) .................. 10 2017 213 099

(51) Int. Cl.
*H02M 1/32* (2007.01)
*H01H 33/59* (2006.01)
(Continued)

(52) U.S. Cl.
CPC ............ *H02M 1/32* (2013.01); *H01H 33/596* (2013.01); *H02J 3/36* (2013.01); *H02M 7/483* (2013.01); *H02M 1/325* (2021.05)

(58) Field of Classification Search
CPC .................. H02M 1/32; H02M 7/483; H02M 2007/4835; H02M 2001/325; H02J 3/36
See application file for complete search history.

(56) References Cited

U.S. PATENT DOCUMENTS

| | | |
|---|---|---|
| 8,111,496 B2 | 2/2012 | Long et al. |
| 8,767,422 B2 | 7/2014 | Jiang-Haefner et al. |

(Continued)

FOREIGN PATENT DOCUMENTS

| | | |
|---|---|---|
| CN | 104578130 A | 4/2015 |
| EP | 2091123 A2 | 8/2009 |

(Continued)

OTHER PUBLICATIONS

De Boeck, Steven et al.; "Configurations and Earthing of HVDC Grids", 2013 IEEE Power & Energy Society General Meeting, Jan. 1, 2013 (Jan. 1, 2013), pp. 1-5, XP055167145, DOI: 10.1109/PESMG.2013.6672808 ISBN: 978-1-47-991303-9.

(Continued)

*Primary Examiner* — Rafael O De Leon Domenech
(74) *Attorney, Agent, or Firm* — Laurence A. Greenberg; Werner H. Stemer; Ralph E. Locher

(57) ABSTRACT

A current converter unit for a high-voltage direct-current (HVDC) transmission contains a first converter and a second converter. A first direct-current terminal of the first converter is connected to a first conductor terminal point for a first HVDC transmission conductor. A second direct-current terminal of the first converter is connected to a first direct-current terminal of the second converter such that a connection point is formed. A second direct-current terminal of (Continued)

the second converter is connected to a second conductor terminal point for a second HVDC transmission conductor. The connection point is connected to ground potential by a current-damping electric component, and the connection point is connected to the ground potential by a direct-current switch.

14 Claims, 3 Drawing Sheets

(51) Int. Cl.
*H02J 3/36* (2006.01)
*H02M 7/483* (2007.01)

(56) References Cited

U.S. PATENT DOCUMENTS

| | | | |
|---|---|---|---|
| 10,084,387 | B2 | 9/2018 | Xu et al. |
| 2018/0109109 | A1* | 4/2018 | Holmgren ................ H02J 1/06 |
| 2018/0145499 | A1 | 5/2018 | Gupta et al. |
| 2018/0226882 | A1* | 8/2018 | Jonsson ................ H02M 7/219 |
| 2018/0287371 | A1* | 10/2018 | Nyberg ...................... H02J 3/36 |
| 2018/0366942 | A1 | 12/2018 | Gupta et al. |

FOREIGN PATENT DOCUMENTS

| | | |
|---|---|---|
| GB | 2536894 A | 10/2016 |
| GB | 2537851 A | 11/2016 |
| WO | 2011150963 A1 | 12/2011 |
| WO | 2015172825 A1 | 11/2015 |
| WO | 2016055106 A1 | 4/2016 |
| WO | 2017031991 A1 | 3/2017 |

OTHER PUBLICATIONS

Bucher, Matthias K et al.; "Comparison of Fault Currents in Multiterminal HVDC Grids with Different Grounding Schemes", 2014 IEEE PES General Meeting, Conference & Exposition, IEEE, Jul. 27, 2014 (Jul. 27, 2014), pp. 1-5, XP032670771, DOI: 10.1109/ PESGM.2014.6938990 [found Oct. 29, 2017].

* cited by examiner

CURRENT CONVERTER UNIT, TRANSMISSION INSTALLATION HAVING A CURRENT CONVERTER UNIT, AND METHOD FOR FAULT MANAGEMENT IN A CURRENT CONVERTER UNIT

BACKGROUND OF THE INVENTION

Field of the Invention

The invention relates to a current converter unit for high-voltage direct current transmission. This current converter unit comprises a first current converter and a second current converter. The invention further relates to a method for fault management in a current converter unit.

Faults occurring on current converters can be cleared by the opening of an AC power circuit-breaker (which connects an AC voltage terminal of the current converter with an AC voltage system). This fault clearance (fault management) by means of an AC power circuit-breaker can also be specifically employed in modular multi-level current converters with half-bridge modules.

However, the occurrence of "asymmetrical faults" is problematic here, specifically internal asymmetrical faults in current converters. These are faults which affect only one pole or two poles of the three-pole (three-phase) AC voltage. It is particularly problematic if the AC power circuit-breaker is connected to the AC voltage terminal of the current converter by means of a transformer, the asymmetrical fault occurs on the secondary side (i.e. the side thereof facing the current converter) of the transformer, and the AC power circuit-breaker is arranged on the primary side of the transformer (i.e. the side of the transformer which is averted from the current converter). Asymmetrical faults of this type result in an asymmetrical current loading on the secondary side of the transformer, which is transmitted to the primary side of the transformer, with the result that the AC flowing in the AC power circuit-breaker no longer features any current zero-crossings (absence of zero-crossings in the AC). This absence of zero-crossings in the AC, further to fault detection, prevents a rapid opening of the AC power circuit-breaker, as the arc which is generated upon the opening of the AC power circuit-breaker is only securely quenched upon the occurrence of zero-crossings in the AC.

However, particularly in modular multi-level power converters with half-bridge modules, rapid fault clearance is necessary, as the conductive freewheeling diodes of the half-bridge modules, in the event of a fault, might otherwise undergo thermal overloading, such that the current converter, in addition to the AC power circuit-breaker, can also sustain irreversible damage.

For the resolution of this problem, in patent application WO 2011/150963 A1, it is proposed that a short-circuiting unit is employed which, in the event of an asymmetrical fault, short-circuits all three phases of the AC voltage grid system in relation to ground. As a result, the asymmetrical fault is converted into a symmetrical fault (i.e. a fault which affects all three phases), as a result of which zero-crossings occur in the AC on the primary side of the transformer.

In patent application WO 2016/055106 A1, it is further proposed that, in the event of an asymmetrical fault, a tertiary winding of the transformer is short-circuited by means of a short-circuiting unit. This is executed such that the three phases of the tertiary winding are mutually short-circuited.

In both of the above-mentioned solutions, it is necessary for short-circuiting switches to be closed in the event of a fault. In the first above-mentioned solution, on the grounds of the resulting short-circuit, the AC grid system, and components connected thereto, are substantially loaded. In the second above-mentioned solution, a tertiary winding of the transformer which is rated for high capacities is required, in order to permit the achievement of a sufficiently rapid influence upon currents flowing on the primary side of the transformer. A tertiary winding of this type is complex and expensive.

BRIEF SUMMARY OF THE INVENTION

The fundamental object of the invention is the disclosure of a current converter unit and a method for fault management in a current converter unit, by means of which current zero-crossings can be achieved, even in the event of an asymmetrical fault.

According to the invention, this object is fulfilled by a current converter unit and by a method as claimed in the independent patent claims. Advantageous forms of embodiment of the current converter unit and of the method are disclosed in the dependent patent claims.

A current converter unit for high-voltage direct current transmission is disclosed:
  having a first current converter and a second current converter,
  wherein a first DC voltage terminal of the first current converter is (electrically) connected to a first conductor terminal point for a first high-voltage direct current transmission conductor,
  wherein a second DC voltage terminal of the first current converter is connected to a first DC voltage terminal of the second current converter, such that a connection point is formed,
  wherein a second DC voltage terminal of the second current converter is connected to a second conductor terminal point for a second high-voltage direct current transmission conductor,
  wherein the connection point is connected to ground potential by means of a current-damping electrical component, and
  the connection point is connected to ground potential by means of a direct current switch.

This current converter unit advantageously comprises said current-damping electrical component, which connects the connection point to the ground potential. The component has an electrical impedance other than zero. By way of distinction from a current converter unit in which the connection point is directly grounded (i.e. wherein the connection point is connected to ground potential, by means of an electrical conductor, in a virtually zero-impedance manner), the current-damping electrical component is provided in this case for the connection of the connection point to ground potential. In the event of the occurrence of an asymmetrical fault, this component damps the fault current which flows from the ground potential to the connection point. It is thus achieved that the primary side alternating currents incorporate current zero-crossings, even in the event of the occurrence of an asymmetrical fault. Primary side alternating currents are the alternating currents which flow on the primary side of a transformer which connects an AC voltage terminal of the current converter to an AC voltage system (AC voltage grid system, or electricity supply system). Advantageously, even with a simple current-damping electrical component, it can be achieved that, in the event of an asymmetrical fault, the primary side alternating currents incorporate zero-crossings.

If, however, in the case of high-voltage direct current transmission, a substantial proportion of the high-voltage direct current flows from the connection point via a ground potential/ground to a further current converter unit (in "ground-return" operation), substantial electrical losses would then occur on the current-damping electrical component; the current-damping electrical component would substantially impair high-voltage direct current transmission. Consequently, the connection point is additionally connected to ground potential by means of the direct current switch. For such time as no asymmetrical fault occurs, the direct current switch is closed. The high-voltage direct current then flows to the ground potential, bypassing the current-damping electrical component; no significant electrical losses occur in the current-damping electrical component. If, however, an asymmetrical fault occurs, the direct current switch is then opened. Thereafter, current is commutated from the direct current switch to the current-damping electrical component. Thereafter, the current is damped by means of the component, and a voltage is constituted on said component. It is thus achieved that a primary-side alternating current incorporates zero-crossings, such that said alternating current can be interrupted by means of an AC power circuit-breaker. Thereafter, the AC power circuit-breaker is opened and the alternating current is interrupted. The asymmetrical fault is clarified accordingly.

The current converter unit can be configured such that:
the direct current switch is connected in parallel with the component. As a result, the direct current switch, in the closed state, bridges the current-damping electrical component.

The current converter unit can be configured such that:
the component incorporates an overvoltage arrester (or the component constitutes an overvoltage arrester). An overvoltage arrester possesses current-damping electrical properties, such that an overvoltage arrester can be employed by way of a current-damping electrical component.

The current converter unit can also be configured such that:
the direct current switch is a DC power circuit-breaker. By means of a direct current power circuit-breaker of this type, high direct currents associated with high-voltage direct current transmission can be safely conducted to the ground potential (bypassing the current-damping electrical component).

The current converter unit can also be configured such that:
the connection to ground potential is constituted by means of a grounding electrode, which possesses a current-carrying capability for the direct current which is to be transmitted in high-voltage direct current transmission. The direct current can thus be safely conducted to the mass of earth surrounding the grounding electrode. The grounding electrode can moreover possess a current-carrying capability for a fault current which occurs in the event of a fault, specifically for a short-circuit current occurring in the event of a fault.

The current converter unit can also be configured such that:
the first current converter and/or the second current converter comprise a series circuit of modules, wherein each of the modules comprises at least two electronic switching elements and an electrical energy store. Modules of this type can specifically be configured as "half-bridge modules".

The current converter unit can also be configured such that:
the first current converter and/or the second current converter respectively constitute a modular multi-level current converter. Specifically, in a modular multi-level current converter having half-bridge modules, the current-damping electrical component can advantageously be employed to ensure the presence of current zero-crossings in the primary-side alternating current flowing in the AC power circuit-breaker.

A high-voltage direct current transmission installation is further disclosed, having a current converter unit according to one of the above-mentioned variants.

A method is further disclosed for fault management in a current converter unit for high-voltage direct current transmission:
wherein the current converter unit comprises a first current converter and a second current converter,
wherein a first DC voltage terminal of the first current converter is (electrically) connected to a first conductor terminal point for a first high-voltage direct current transmission conductor,
wherein a second DC voltage terminal of the first current converter is connected to a first DC voltage terminal of the second current converter, such that a connection point is formed,
wherein a second DC voltage terminal of the second current converter is connected to a second conductor terminal point for a second high-voltage direct current transmission conductor,
wherein the connection point is connected to ground potential by means of a current-damping electrical component,
wherein the connection point is connected to ground potential by means of a direct current switch, and
wherein an AC voltage terminal of the first current converter is connected to a secondary winding of a first transformer, and a primary winding of the first transformer is connected via a first AC power circuit-breaker to an electricity supply system, wherein, according to the method:
a direct current flows from the connection point via the closed direct current switch, the grounding electrode and the mass of earth to a further current converter unit which participates in high-voltage direct current transmission,
in response to a fault on the AC voltage terminal of the first current converter, specifically in response to a single-pole or two-pole fault (internally to the current converter) on the AC voltage terminal of the first current converter, the direct current switch is opened,
thereafter, a current flowing in the direct current switch is commutated from said direct current switch to the current-damping electrical component,
the current is damped by means of the component, and a voltage is constituted on said component, as a result of which an alternating current flowing in the primary winding of the first transformer incorporates zero-crossings, such that said alternating current can be interrupted by means of the first AC power circuit-breaker.

This method can be executed such that:
thereafter, the first alternating current power circuit-breaker is opened.

This method can be executed such that:
an AC voltage terminal of the second current converter is connected to a secondary winding of a second transformer, and a primary winding of the second transformer is connected by means of a second AC power circuit-breaker to the electricity supply system, wherein, according to the method:

in response to a fault on the AC voltage terminal of the first current converter, or on the AC voltage terminal of the second current converter, specifically in response to a single-pole or two-pole fault (internally to the current converter) on the AC voltage terminal of the first current converter, or on the AC voltage terminal of the second current converter, the direct current switch is opened, thereafter, the current is commutated from the direct current switch to the current-damping electrical component, the current is damped by means of the component, and a voltage is constituted on said component, as a result of which an alternating current flowing in the primary winding of the first transformer or in the primary winding of the second transformer incorporates zero-crossings, such that said alternating current can be interrupted by means of the first AC power circuit-breaker, or by means of the second AC power circuit-breaker.

This method can be executed such that:

thereafter, the first AC power circuit-breaker or the second AC power circuit-breaker is opened.

The method provides equivalent advantages to those described heretofore with reference to the current converter unit.

The invention is described in greater detail hereinafter, with reference to exemplary embodiments. Identical or identically acting elements are identified by the same reference numbers.

DESCRIPTION OF THE INVENTION

Figure 1:
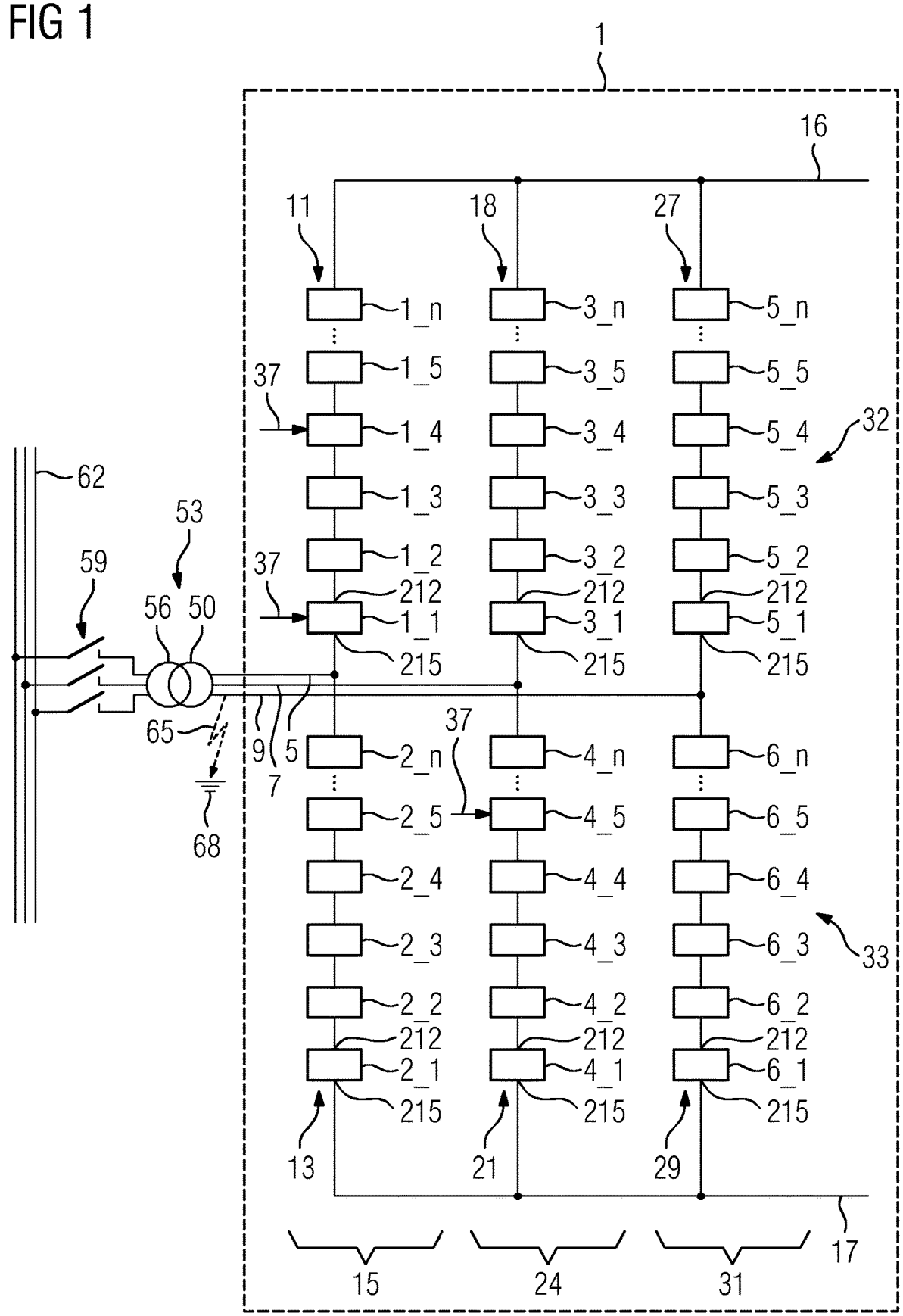
FIG. 1 represents an exemplary embodiment of a current converter having a plurality of modules.

FIG. 1 represents a current converter 1 in the form of a modular multi-level current converter 1 (or MMC). This multi-level current converter 1 comprises a first AC voltage terminal 5, a second AC voltage terminal 7, and a third AC voltage terminal 9. The first AC voltage terminal 5 is electrically connected to a first phase module branch 11 and a second phase module branch 13. The first phase module branch 11 and the second phase module branch 13 constitute a first phase module 15 of the current converter 1. The end of the first phase module branch 11 which is averted from the first AC voltage terminal 5 is electrically connected to a first DC voltage terminal 16; the end of the second phase module branch 13 which is averted from the first AC voltage terminal 5 is electrically connected to a second DC voltage terminal 17.

The second AC voltage terminal 7 is electrically connected to one end of a third phase module branch 18 and to one end of a fourth phase module branch 21. The third phase module branch 18 and the fourth phase module branch 21 constitute a second phase module 24. The third AC voltage terminal 9 is electrically connected to one end of a fifth phase module branch 27 and to one end of a sixth phase module branch 29. The fifth phase module branch 27 and the sixth phase module branch 29 constitute a third phase module 31.

The end of the third phase module branch 18 which is averted from the second AC voltage terminal 7 and the end of the fifth phase module branch 27 which is averted from the third AC voltage terminal 9 are electrically connected to the first DC voltage terminal 16. The end of the fourth phase module branch 21 which is averted from the second AC voltage terminal 7 and the end of the sixth phase module branch 29 which is averted from the third AC voltage terminal 9 are electrically connected to the second DC voltage terminal 17. The first phase module branch 11, the third phase module branch 18 and the fifth phase module branch 27 constitute one current converter section 32; the second phase module branch 13, the fourth phase module branch 21 and the sixth phase module branch 29 constitute one current converter section 33.

Each phase module branch comprises a plurality of modules (1_1, 1_2, 1_3, 1_4 . . . 1_n; 2_1 . . . 2_n; etc.) which (by means of their galvanic current terminals) are electrically connected in series. Modules of this type are also described as sub-modules. In the exemplary embodiment according to FIG. 1, each phase module branch comprises n modules. The number of modules which are electrically connected in series by means of their galvanic current terminals can vary substantially; although at least three modules are connected in series, it is also possible, for example, for 50, 100 or more modules to be electrically connected in series. In the exemplary embodiment, n=36: the first phase module branch 11 thus comprises 36 modules 1_1, 1_2, 1_3, . . . 1_36. The other phase module branches 13, 18, 21, 27 and 29 assume an identical layout.

The modules 1_1 to 6_n are actuated by means of an unrepresented control apparatus. From this central control apparatus, optical messages or optical signals are transmitted via an optical communication link 37 (for example, an optical waveguide) to the individual modules. Message transmission between the control apparatus and a module is symbolically represented in each case by an arrow 37; the direction of message transmission is symbolized by the head of the arrow. This is represented, by way of an example, for modules 1_1, 1_4 and 4_5; messages are transmitted to the remaining modules in the same manner. In each case, for example, the control apparatus transmits a target value to the individual modules for the magnitude of the output voltage which each module is intended to deliver.

The first AC voltage terminal 5, the second AC voltage terminal 7 and the third AC voltage terminal 9 are electrically connected to secondary windings 50 of a three-phase transformer 53. Primary windings 56 of the transformer 53 are electrically connected via a three-pole AC power circuit-breaker 59 to an AC voltage system 62. The AC voltage system 62 can be, for example, an AC voltage grid system 62 (specifically an AC electricity supply system). The secondary windings 50 and the primary windings 56 can be respectively interconnected as required, for example in a star-connected or a delta-connected arrangement.

By way of an example, in FIG. 1, a single-pole (single-phase) fault 65 is represented, which occurs on the third AC voltage terminal 9 of the current converter 1. In the exemplary embodiment, this involves a ground fault 65 on the phase of the AC voltage which is assigned to the third AC voltage terminal 9. A fault of this type occurring between one phase of the AC voltage on the current converter 1 and the ground potential 68 results in an asymmetrical current loading on the secondary side (i.e. the side facing the current converter 1) of the transformer, which is transmitted to the primary side (i.e. the side averted from the current converter 1) of the transformer, with the result that the AC flowing in the AC power circuit-breaker 59 no longer features any current zero-crossings. Such an "absence of zero-crossings" in the AC flowing in the AC power circuit-breaker 59, (further to the detection of the fault 65) impairs the rapid opening of the AC power circuit-breaker 59. The reason for this is that, in the absence of zero-crossings in the current, an arc (which is generated upon the opening of the mechanical contacts of the AC power circuit-breaker 59) is not reliably quenched. It is therefore desirable that the current flowing in the AC power circuit-breaker 59, even in the event of an asymmetrical fault 65, should continue to feature current zero-crossings. This is achieved by means of the current-damping electrical component, as described hereinafter.

Figure 2:
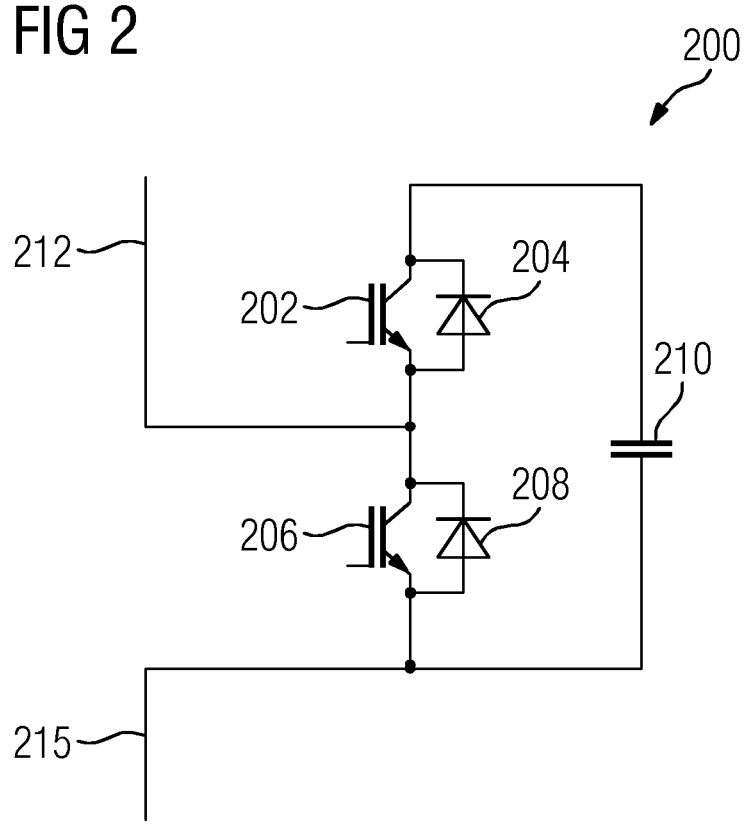
FIG. 2 represents an exemplary embodiment of a module of the current converter.

In FIG. 2, an exemplary embodiment of a module 200 of the current converter 1 is represented. This can be, for example, one of the modules 1_1 ... 6_n represented in FIG. 1.

The module 200 is configured as a half-bridge module 200. The module 200 comprises a first (interruptible) electronic switching element 202 (first interruptible semiconductor valve 202) having a first antiparallel-connected diode 204.

The module 200 further comprises a second (interruptible) electronic switching element 206 (second interruptible semiconductor valve 206) having a second antiparallel-connected diode 208 and an electrical energy store 210 in the form of a capacitor 210. The first electronic switching element 202 and the second electronic switching element 206 are respectively configured as an IGBT (insulated-gate bipolar transistor). The first electronic switching element 202 is electrically connected in series with the second electronic switching element 206. At the connection point between the two electronic switching elements 202 and 206, a first galvanic module terminal 212 is arranged. On the terminal of the second electronic switching element 206 which is arranged opposite the connection point, a second galvanic module terminal 215 is arranged. The second module terminal 215 is further electrically connected to a first terminal of the energy store 210; a second terminal of the energy store 210 is electrically connected to the terminal of the first electronic switching element 202 which is arranged opposite the connection point.

The energy store 210 is thus electrically connected in parallel with the series circuit comprised of the first electronic switching element 202 and the second electronic switching element 206. By the corresponding actuation of the first electronic switching element 202 and the second electronic switching element 206, by means of an (unrepresented) electronic control apparatus of the current converter, it can be achieved that, between the first module terminal 212 and the second module terminal 215, either the voltage output of the energy store 210 is delivered or no voltage output is delivered (i.e. a zero voltage output). By the interaction of the modules of the individual phase module branches, the respectively desired output voltage of the current converter can thus be generated.

Figure 3:
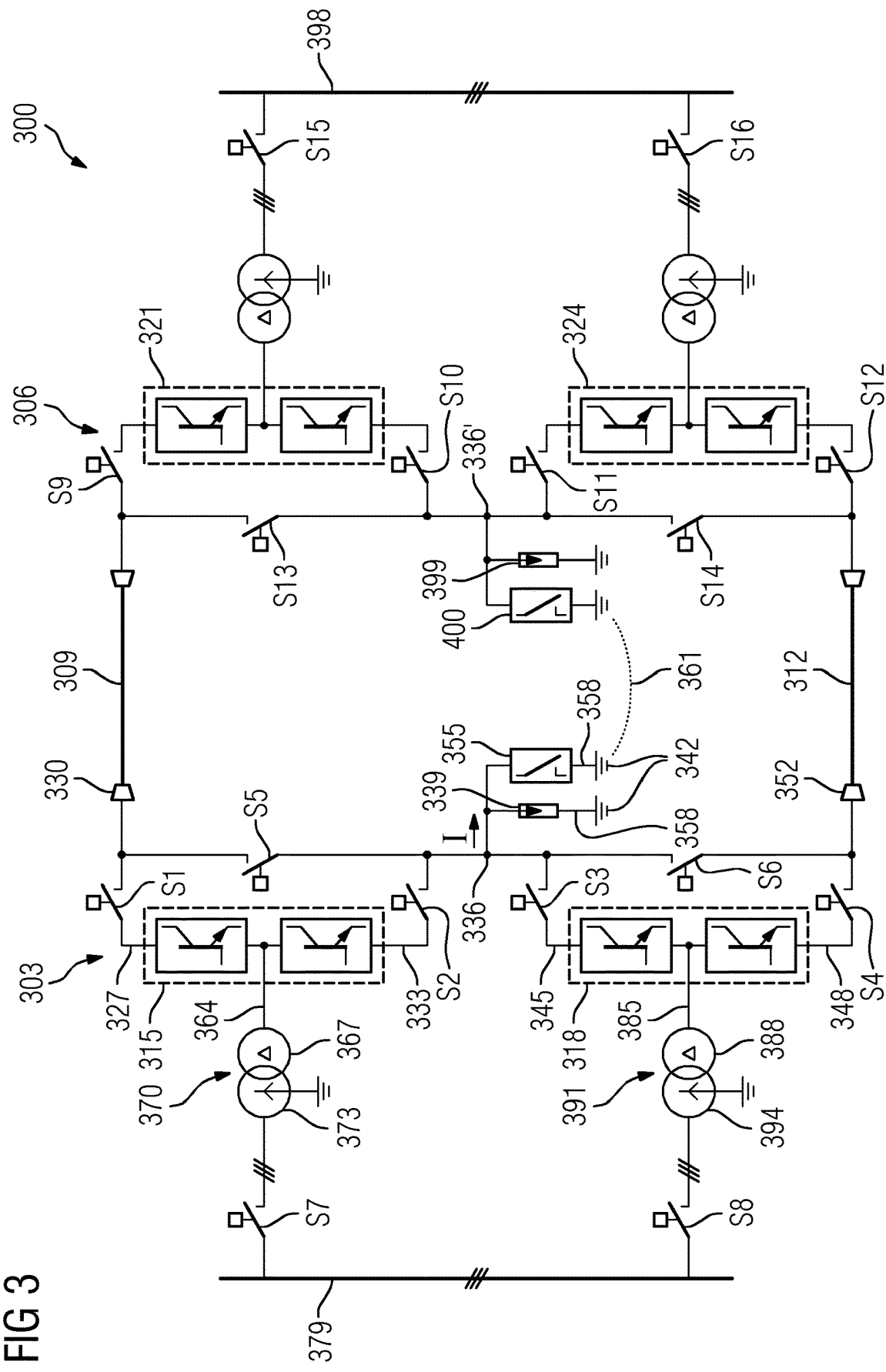
FIG. 3 represents an exemplary embodiment of a high-voltage direct current transmission installation having two current converter units.

In FIG. 3, an exemplary embodiment of a high-voltage direct current transmission installation 300 (HVDC installation 300) is represented. This HVDC installation comprises a first current converter unit 303 and a second current converter unit 306. The first current converter unit 303 and a second current converter unit 306 are mutually electrically connected by means of a first high-voltage direct current transmission conductor 309 (HVDC conductor 309) and by means of a second HVDC conductor 312. The first current converter unit 303 constitutes a first current converter station 303 of the HVDC installation 300; the second current converter unit 306 constitutes a second current converter station 306 of the HVDC installation 300.

The first current converter unit 303 comprises a first current converter 315 and a second current converter 318. The second current converter unit 306 comprises a first current converter 321 and a second current converter 324. A first DC voltage terminal 327 of the first current converter 315 is electrically connected to a first conductor terminal point 330 for the first high-voltage direct current transmission conductor 309. A second DC voltage terminal 333 of the first current converter 315 is electrically connected to a current-damping electrical component 339, such that a connection point 336 is formed. The current-damping electrical component 339 has an electrical impedance other than zero. The current-damping electrical component 339 connects the connection point 336 to a ground potential 342. In other words, the connection point 336 is electrically connected to the ground potential 342 by means of the current-damping electrical component 339. The connection point 336 is electrically connected to a first DC voltage terminal 345 of the second current converter 318. A second DC voltage terminal 348 of the second current converter 318 is electrically connected to a second conductor terminal point 352 for the second high-voltage direct current transmission conductor 312.

In the HVDC installation 300, electrical switches S1 to S16 are arranged. By means of said switches S1 to S16, different parts of the installation can be electrically isolated or bridged, as required. By means of these switches, the HVDC installation 300 can thus be configured such that, for example, individual current converters are bridged, or such that individual current converters are isolated from the remainder of the installation. The switch S7 is a first AC power circuit-breaker S7; the switch S8 is a second AC power circuit-breaker S8. The switch S15 is a third AC power circuit-breaker S15, and the switch S16 is a fourth AC power circuit-breaker S16. The remaining switches S1-S6 and S9-S14 are optional switches, i.e. in general, the HVDC installation 300 functions even in the absence of these optional switches.

In the exemplary embodiment, the current-damping electrical component 339 is an overvoltage arrester 339. This overvoltage arrester 339 possesses resistive properties, as a result of which the current flowing in the overvoltage arrester 339 is damped. A direct current switch 355 is connected in parallel with the current-damping electrical component 339. The connection point 336 can thus be additionally connected to the ground potential 342 by means of the direct current switch 355. The connection between the current-damping electrical component 339 and the ground potential 342 or between the direct current switch 355 and the ground potential 342 is constituted by means of at least one grounding electrode 358. Specifically, the grounding electrode 358 which connects the direct current switch 355 to the ground potential 342 possesses a current-carrying capability for the high-voltage direct current which is to be transmitted by high-voltage direct current transmission. This means that, optionally, the entire high-voltage direct current to be transmitted can (continuously) flow through this grounding electrode 358 and through the mass of earth to the further current converter unit 306 which is involved in high-voltage direct current transmission. This current transmission through the mass of earth is represented in FIG. 3 by a dotted line 361.

The direct current switch 355 can be implemented by various means. The direct current switch 355 is advantageously configured as an electronic direct current power switch. This means that the direct current switch comprises an electronic power switching element and a parallel-connected energy intake path. An overvoltage arrester can be arranged in the energy intake path. Advantageously, the direct current switch 355 can be a non-oscillating electronic direct current power switch.

An AC voltage terminal 364 of the first current converter 315 is electrically connected to secondary windings 367 of a three-phase transformer 370. Primary windings 373 of the transformer 370 are electrically connected to a first AC voltage system 379 (specifically to an AC voltage grid system 379) via the three-phase AC power circuit-breaker S7.

In the same manner, an AC voltage terminal 385 of the second current converter 318 is electrically connected to secondary windings 388 of a second transformer 391. Primary windings 394 of the second transformer 391 are connected to the AC voltage system 379 via a second AC power circuit-breaker S8.

For the alternating current flowing in the AC power circuit-breaker S7, the current-damping electrical component 339 ensures that, even in the event of an asymmetrical fault, current zero-crossings are present. The alternating current flowing in said AC power circuit-breaker S7 thus constitutes the current which is flowing on the primary side of the first transformer 370. In normal duty, the AC power circuit-breaker S7 is closed, such that the operating current of the current converter flows through the AC power circuit-breaker S7. Upon the detection of a fault, specifically upon the detection of an asymmetrical fault, the AC power circuit-breaker S7 is opened. The same also applies, correspondingly, to the second AC power circuit-breaker S8. For the alternating current flowing in the second AC power circuit-breaker S8, the current-damping electrical component 339 also ensures that, in the event of an asymmetrical fault, current zero-crossings are present.

The second current converter unit 306 is configured with an identical layout to the first current converter unit 303. The first current converter 321 and the second current converter 324 of the second current converter unit 306 are electrically connected in series, such that a second connection point 336' is formed. The second current converter unit 306 is also connected in an identical manner, via transformers and AC power circuit-breakers, to a second AC voltage system 398 (specifically to a second AC grid system 398). Optionally, the second current converter unit 306 can additionally comprise a second current-damping electrical component 399 having a parallel-connected second direct current switch 400. The second current-damping electrical component 399 can be bridged by means of the second direct current switch 400.

If, in high-voltage direct current transmission, "ground-return" operation applies, the AC power circuit-breakers S7, S8, S15, S16, the first direct current switch 355 and the second direct current switch 400 are closed. A substantial proportion of the high-voltage direct current (or even the entire high-voltage direct current) flows from the first connection point 336 of the first current converter unit 303 via the closed first direct current switch 355, the first grounding electrode 358, ground 361 and the closed second direct current switch 400 to the second connection point 336' of the second current converter unit 306. This current flow therefore bypasses the first current-damping electrical component 339 and the second current-damping electrical component 399. As a result, no significant electrical losses occur on the current-damping electrical components 339, 399; the current-damping electrical components do not impair high-voltage direct current transmission.

If, for example, an asymmetrical fault (specifically an internal current converter fault) now occurs on the AC voltage terminal 364 of the first current converter 315, this can result in the absence of regular zero-crossings in at least one of the primary side alternating currents of the transformer 370 (absence of zero-crossings in the primary side alternating current). As a result, at least this one primary side alternating current cannot reliably be interrupted by the AC power circuit-breaker S7. Consequently, upon the occurrence of the asymmetrical fault, the direct current switch 355 is opened. The current flowing in the direct current switch 355 is commutated thereafter from the direct current switch 355 to the current-damping electrical component 339. Thereafter, said current is damped by means of the component 339, and a voltage is constituted on said component 339. It is thus achieved that the primary side alternating current (present on the transformer 370) incorporates zero-crossings, such that said alternating current can be interrupted by means of the AC power circuit-breaker S7. Thereafter, the AC power circuit-breaker S7 is opened and the alternating current is interrupted. The asymmetrical fault is clarified accordingly.

A current converter unit and a method have been described in which, by means of a current-damping electrical component, the presence of zero-crossings in the alternating current on the primary side AC voltage terminals of the transformers is ensured, even in the event of an asymmetrical fault (internally to the current converter). By means of the current-damping electrical component (when an asymmetric fault occurs), an electrical impedance is introduced into the grounding path of the current converter unit. It is particularly advantageous that, by means of the current-damping electrical component, asymmetrical faults can be clarified, without the necessity for short-circuiting switches on the primary side, the secondary side or the tertiary side of the transformer. In comparison with a short-circuiting switch of this type, it is particularly advantageous that no additional loading of the AC voltage grid system (AC voltage system) occurs. Moreover, a conventional AC power circuit-breaker can advantageously be employed, as the presence of zero-crossings in the current (flowing in the AC power circuit-breaker) is ensured. No novel actuation of the AC power circuit-breaker is required (conventional control and protection software can be employed), and no novel coordination of the AC power circuit-breaker is also otherwise required.

In comparison with a tertiary side short-circuiting device, the following advantages are provided:
- a cost-effective transformer design is possible (no tertiary winding with a high loading capability is required)
- essentially, there is no dependence upon network parameters
- no novel adaptations of control and protection software are required, as a conventional AC power circuit-breaker can be employed.

Moreover, the current converter unit and the method can also be advantageously employed in ground-return operation. As a result of the bridging of the current-damping electrical component by means of the direct current switch, in the absence of an asymmetrical fault, no electrical losses occur in the current-damping electrical component. In other words, in general, a current only flows through the current-damping electrical component in the event of the occurrence of an asymmetrical fault; particularly the direct current switch is then opened. The direct current switch constitutes a DC power circuit-breaker, which is arranged between the grounding electrode and the connection point.

Advantageously therefore, specifically, the fault clearance of asymmetrical internal current converter faults (internally to the converter) is possible (for example, single-pole faults to ground). The solution described can be particularly advantageously employed in bipolar voltage source converters having half-bridge modules. Specifically, the current converter unit and the method can be employed in bipolar HVDC systems and in asymmetrical monopolar HVDC systems.

The current converter unit described and the method described for HVDC transmission with a grounding electrode connection via a direct current switch also provide the following advantages:
  For bipolar and monopolar operation, the high-resistance connection by means of the current-damping electrical component provides sufficient current damping to ensure fault clearance by means of the AC power circuit-breaker.
  The direct current switch is only arranged in the current path during operation via the grounding electrodes/ground, and permits secure fault clearance by means of the AC power circuit-breaker.

The invention claimed is:

1. A current converter unit for a high-voltage direct current transmission, the current convert unit comprising:
  transformers each having a primary winding and a secondary winding;
  AC power circuit-breakers, one of said AC power circuit-breakers connected between one of said transformers and an AC conductor;
  a first current converter having a first DC voltage terminal, a second DC voltage terminal, and an AC voltage terminal connected to said secondary winding of a first transformer of said transformers;
  a second current converter having a first DC voltage terminal, a second DC voltage terminal, and an AC voltage terminal connected to said secondary winding of a second transformer of said transformers;
  said first DC voltage terminal of said first current converter for connecting to a first conductor terminal point of a first high-voltage direct current transmission conductor and said second DC voltage terminal of said first current converter connected to said first DC voltage terminal of said second current converter, such that a connection point is formed;
  said second DC voltage terminal of said second current converter for connecting to a second conductor terminal point of a second high-voltage direct current transmission conductor;
  a current-damping electrical component, said connection point being connected to a ground potential by means of said current-damping electrical component, a presence of regular zero-crossings in an alternating current on said primary winding of said transformers during an asymmetrical fault internal to the current converter unit being ensured by said current-damping electrical component before said AC power circuit-breakers are triggered; and
  a direct current switch configured and controlled to connect said connection point to the ground potential before said AC power circuit-breakers are triggered to interrupt the alternating current at said zero-crossings in the alternating current on said primary winding of said transformers.

2. The current converter unit according to claim 1, wherein said direct current switch is connected in parallel with said current-damping electrical component.

3. The current converter unit according to claim 1, wherein said current-damping electrical component has an overvoltage arrester.

4. The current converter unit according to claim 1, wherein said direct current switch is a DC power circuit-breaker.

5. The current converter unit according to claim 1, further comprising a grounding electrode connected between said connection point and the ground potential, said grounding electrode possesses a current-carrying capability for a direct current which is to be transmitted in the high-voltage direct current transmission, and for a fault current which occurs in an event of the asymmetrical fault, specifically for a short-circuit current occurring in the event of a fault.

6. The current converter unit according to claim 1, wherein said first current converter and/or said second current converter contains a series circuit of modules, wherein each of said modules contains at least two electronic switching elements and an electrical energy store.

7. The current converter unit according to claim 1, wherein said first current converter and/or said second current converter is a modular multi-level current converter.

8. A high-voltage direct current transmission installation, comprising:
  transformers each having a primary winding and a secondary winding;
  AC power circuit-breakers, one of said AC power circuit-breakers connected between one of said transformers and an AC conductor;
  a first high-voltage direct current transmission conductor having a first conductor terminal point;
  a second high-voltage direct current transmission conductor having a second conductor terminal point; and
  a current converter unit, containing:
    a first current converter having a first DC voltage terminal, a second DC voltage terminal, and an AC voltage terminal connected to said secondary winding of a first transformer of said transformers;
    a second current converter having a first DC voltage terminal, and a second DC voltage terminal, and an AC voltage terminal connected to said secondary winding of a second transformer of said transformers;
    said first DC voltage terminal of said first current converter connected to said first conductor terminal point of said first high-voltage direct current transmission conductor and said second DC voltage terminal of said first current converter connected to said first DC voltage terminal of said second current converter, such that a connection point is formed;
    said second DC voltage terminal of said second current converter connected to said second conductor terminal point of said second high-voltage direct current transmission conductor;
    a current-damping electrical component, said connection point being connected to a ground potential by means of said current-damping electrical component, a presence of regular zero-crossings in an alternating current on said primary winding of said transformers during an asymmetrical fault internal to the current converter unit being ensured by said current-damping electrical component before said AC power circuit-breakers are triggered; and a direct current switch configured and controlled to connect said connection point to the ground potential before said AC power circuit-breakers are triggered to interrupt the alternating current at said zero-crossings in the alternating current on said primary winding of said transformers.

9. A method for fault management in a current converter unit for high-voltage direct current transmission, wherein the current converter unit having a first current converter and a second current converter, wherein a first DC voltage terminal of the first current converter is connected to a first conductor terminal point for a first high-voltage direct current transmission conductor, wherein a second DC voltage terminal of the first current converter is connected to a first DC voltage terminal of the second current converter, such that a connection point is formed, wherein a second DC voltage terminal of the second current converter is connected to a second conductor terminal point for a second high-voltage direct current transmission conductor, wherein the connection point is connected to a ground potential by means of a current-damping electrical component, wherein the connection point is connected to the ground potential by means of a direct current switch, and wherein an AC voltage terminal of the first current converter is connected to a secondary winding of a first transformer, and a primary winding of the first transformer is connected via a first AC power circuit-breaker to an electricity supply system, which comprises the steps of:

flowing a direct current from the connection point via the direct current switch being a closed direct current switch, the grounding electrode and a mass of earth to a further current converter unit which participates in the high-voltage direct current transmission;

opening the direct current switch in response to a fault on the AC voltage terminal of the first current converter before opening the first AC power circuit-breaker;

subsequent to opening the direct current switch in response to the fault, commutating a current flowing in the direct current switch from the direct current switch to the current-damping electrical component, the current is damped by means of the current-damping electrical component, and a voltage is constituted on the current-damping electrical component, as a result of which an alternating current flowing in the primary winding of the first transformer incorporates zero-crossings; and subsequent to opening the direct current switch in response to the fault, interrupting the alternating current at one of the zero crossings of the alternating current by the first AC power circuit-breaker.

10. The method according to claim 9, which further comprises subsequently opening the first AC power circuit-breaker.

11. The method according to claim 9, wherein an AC voltage terminal of the second current converter is connected to a secondary winding of a second transformer, and a primary winding of the second transformer is connected by means of a second AC power circuit-breaker to the electricity supply system, which method further comprises:

opening the direct current switch in response to a fault on the AC voltage terminal of the first current converter or on the AC voltage terminal of the second current converter; and subsequently commutating a current flowing in the direct current switch to the current-damping electrical component, the current is damped by means of the current-damping electrical component, and a voltage is constituted on said component, as a result of which an alternating current flowing in the primary winding of the first transformer or in the primary winding of the second transformer incorporates zero-crossings, such that said alternating current can be interrupted by means of the first AC power circuit-breaker, or by means of the second AC power circuit-breaker.

12. The method according to claim 11, which further comprises subsequently opening the first AC power circuit-breaker or the second AC power circuit-breaker.

13. The method according to claim 11, which further comprises opening the direct current switch in response to a single-pole or two-pole fault on the AC voltage terminal of the first current converter, or on the AC voltage terminal of the second current converter.

14. The method according to claim 9, which further comprises opening the direct current switch in response to a single-pole or two-pole fault on the AC voltage terminal of the first current converter.

* * * * *